United States Patent [19]

Akins

[11] Patent Number: 5,138,981
[45] Date of Patent: Aug. 18, 1992

[54] ANIMAL CONTAINMENT PEN

[76] Inventor: Edward A. Akins, Box 158, St. Boniface, Winnipeg, Manitoba, Canada

[21] Appl. No.: 626,212

[22] Filed: Dec. 12, 1990

Related U.S. Application Data

[63] Continuation-in-part of Ser. No. 466,964, Jan. 18, 1990, abandoned.

[51] Int. Cl.$^5$ .............................................. A61D 3/00
[52] U.S. Cl. .................................... 119/99; 119/103
[58] Field of Search ............... 119/98, 99, 101, 147.1, 119/148, 155, 103

[56] References Cited

U.S. PATENT DOCUMENTS

| | | | |
|---|---|---|---|
| 2,477,213 | 7/1949 | Staggs | 119/103 |
| 2,520,585 | 8/1950 | Walker et al. | 119/103 |
| 2,861,546 | 11/1958 | Stroup | 119/98 |
| 3,885,527 | 5/1975 | Maffey | 119/98 |
| 4,116,166 | 9/1978 | Gofflot | 119/99 |
| 4,312,299 | 1/1982 | Leiker | 119/98 |
| 4,517,924 | 5/1985 | McCan et al. | 119/98 |
| 4,782,791 | 11/1988 | Brock | 119/99 |

FOREIGN PATENT DOCUMENTS

| | | | |
|---|---|---|---|
| 224271 | 6/1958 | Australia | 119/98 |
| 2385326 | 12/1978 | France | 119/103 |

OTHER PUBLICATIONS

*W-W Livestock Equipment*, Nanton, Alberta Canada.

Primary Examiner—Gene Mancene
Assistant Examiner—Todd E. Manahan
Attorney, Agent, or Firm—Adrian D. Battison; Stanley G. Ade; Murray E. Thrift

[57] ABSTRACT

An animal containment pen particularly for use as a maternity pen for calfing cows includes a front panel, two side panels, and a rear gate. The front panel includes a head gate section adjacent one side panel and a squeeze panel pivotally mounted on the front panel and movable from a position alongside the front panel to a position squeezing the animal between the squeeze panel and the side panel adjacent the heat gate. A sliding gate is provided in the front panel between the squeeze panel and the opposite side. The squeeze panel and the head gate are directly mounted in the plane of the front panel so as to be formed therewith in an economic construction. The squeeze panel is mounted relative to the head gate so that movement of the squeeze panel to the squeezing position forces the head gate into a closed position to grasp the neck of the animal. The side panel against which the squeeze panel cooperates includes basically a flat sheet a lower rear part of which can be opened to allow access to the rear part of the animal. The squeeze panel can be automatically latched in place as it moves toward the side panel by a latch arrangement which cooperates with the side panel.

13 Claims, 4 Drawing Sheets

ANIMAL CONTAINMENT PEN

This application is a continuation in part of application Ser. No. 466,964 filed Jan. 18, 1990 now abandoned. Reference is also made to copending application Ser. No. 626,454 filed simultaneously with this application on Dec. 12, 1990 which makes claim to and describes features shown herein.

BACKGROUND OF THE INVENTION

This invention relates to an animal containment pen including a front panel for use with side and rear panels.

Various designs of animal containment pen are known and in many cases, particularly but not exclusively in relation to cattle, the pen includes a head gate arrangement so the head of the animal is grasped and confined so that the animal cannot move forwardly or rearwardly. This has a calming action on the animal and in many cases is associated with squeezing the body so the animal does not cause damage to itself by struggling to become free.

Many headgates are however designed only for temporary holding of the animal for example for inspection or branding following which the animal is quickly released.

One proposal has already been made for a pen of this general type which is for confinement of an animal particularly during the birthing and the immediately subsequent time so that the animal is confined and available for observation and for any rapid assistance should difficulties arise during the birth. In addition, the pen is designed so that the cow is maintained in a confined manner while the calf is free to roam inside the pen and to suckle from the cow.

SUMMARY OF THE INVENTION

It is one object of the present invention to provide an improved animal confinement pen particularly for use with cows during the birth process and the initial subsequent period.

According to a first aspect of the invention, there is provided a animal containment pen comprising a front panel, two side panels, and a rear panel, the front panel comprising a substantially planar panel body defined by a plurality of upright frame posts and a plurality of transverse frame rails lying in a common vertical plane including a first end post at one end of the panel, a second end post at a second end of the panel opposed to the first end, a top rail and a bottom rail interconnecting said end posts and at least one intermediate post connected to said top rail and said bottom rail, a headgate section mounted on said first end post and one intermediate post and defining a headgate opening in the panel body adjacent said first end of the panel body, a hinged squeeze panel mounted on the panel body for pivotal movement about a vertical axis defined by the panel body at one side of the head gate section remote from said first end post so as to squeeze one side of an animal confined with its head in the head gate opening, the head gate section comprising a first vertical neck engaging member mounted on said first end post, a second neck engaging member mounted on said one intermediate post, the neck engaging members being movable from a closed position in which the animals neck is confined to an open position in which the distance between the first and second neck engaging members is increased to allow entry and exit of the head of the animal from the headgate section, a first one of said side panels adjacent said first end post being arranged to contact an opposed side of the animal when squeezed by said squeeze panel, said first side panel including means for contacting the adjacent side of the animal and having means thereon for preventing passage therethrough of the animal, one portion of the surface being openable to allow access to a portion of the animal while preventing the escape of the animal.

According to a second aspect of the invention, there is provided an animal containment pen comprising a front panel, two side panels, and a rear panel, the front panel comprising a substantially planar panel body defined by a plurality of upright frame posts and a plurality of transverse frame rails lying in a common vertical plane including a first end post at one end of the panel, a second end post at a second end of the panel opposed to the first end, a top rail and a bottom rail interconnecting said end posts and at least one intermediate post connected to said top rail and said bottom rail, a headgate section mounted on said first end post and one intermediate post and defining a headgate opening in the panel body adjacent said first end of the panel body, a hinged squeeze panel mounted on the panel body for pivotal movement about a vertical axis defined by the panel body at one side of the head gate section remote from said first end post so as to squeeze one side of an animal confined with its head in the head gate opening, the head gate section comprising a first vertical neck engaging member mounted on said first end post, a second neck engaging member mounted on said one intermediate post, the neck engaging members being movable from a closed position in which the animals neck is confined to an open position in which the distance between the first and second neck engaging members is increased to allow entry and exit of the head of the animal from the headgate section, a first one of said side panels adjacent said first end post being arranged to contact an opposed side of the animal when squeezed by said squeeze panel, and latch means for latching said squeeze side panel at a required position of squeezing, said latch means being responsive to movement of the squeeze side panel to the required location to latch said squeeze side panel at the required location.

According to a third aspect of the invention, there is provided a animal containment pen comprising a front panel, two side panels, and a rear panel, the front panel comprising a substantially planar panel body defined by a plurality of upright frame posts and a plurality of transverse frame rails lying in a common vertical plane including a first end post at one end of the panel, a second end post at a second end of the panel opposed to the first end, a top rail and a bottom rail interconnecting said end posts and at least one intermediate post connected to said top rail and said bottom rail, a headgate section mounted on said first end post and one intermediate post and defining a headgate opening in the panel body adjacent said first end of the panel body, a hinged squeeze panel mounted on the panel body for pivotal movement about a vertical axis defined by the panel body at one side of the head gate section remote from said first end post so as to squeeze one side of an animal confined with its head in the head gate opening, the head gate section comprising a first vertical neck engaging member mounted on said first end post, a second neck engaging member mounted on said one intermediate post, the neck engaging members being movable from a neck engaging position in which the animals neck is confined to a receiving position in which the distance between the first and second neck engaging members is increased to allow entry and exit of the head of the animal into the headgate section, said squeeze side panel being mounted such that movement thereof from an open position toward a squeezing position causes movement of the headgate from the receiving position to the neck engaging position thereof.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
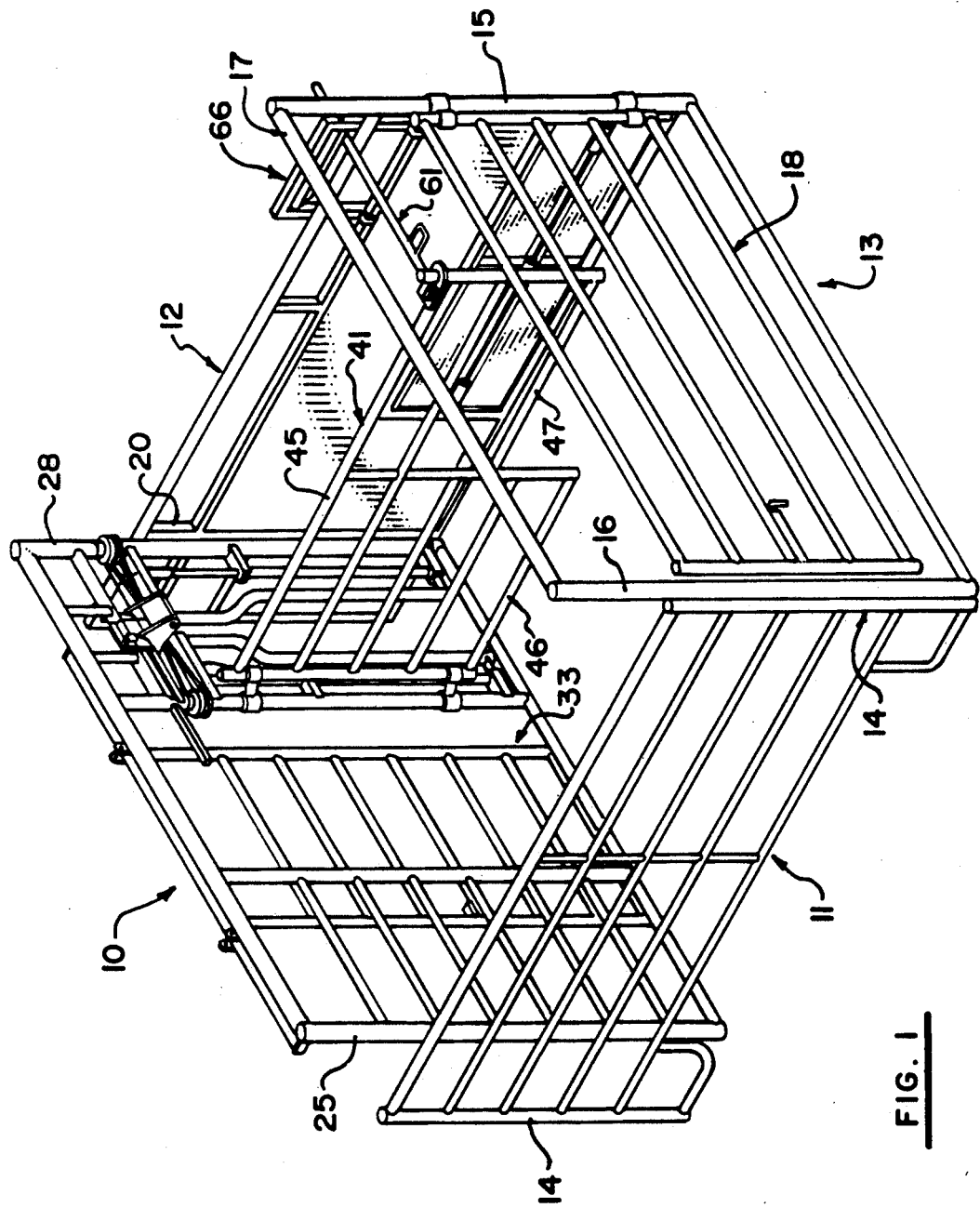
FIG. 1 is an isometric view of a confinement pen for animals according to the invention.

The pen as best shown in FIG. 1 includes a front panel 10, two side panels 11 and 12 and a rear panel 13.

The side panel is substantially of conventional construction including a pair of vertical uprights 14 and a plurality of horizontal rails. The rear panel 13 includes a pair of vertical posts 15 and 16 which are connected across the top at a height above the normal height of the animal by a rail 17. A swinging gate 18 is mounted for hinging action about the post 15 so that it can be moved from the closed position shown in FIG. 1 to an open position opened outwardly away from the pen to allow the entry into the pen of the animal or of the operator.

The side panel 12 (FIG. 4) includes uprights 14 and a plurality of horizontal rails and is modified by addition of a flat sheet 14B which is laid over the inner surface of the panel to define a flat surface against which the animal can be pressed. Each of the side panels 11 and 12 includes an upright 20 at a position space from the front end of the panel by distance of the order of two to three feet. Each of the uprights 20 is arranged for connection to a respective end of the front panel 10 so the front panel is held in a vertical plane spaced form the front end of the side panels thus defining an area 22 behind the front panel 10 and in front of a wall 23 shown in FIG. 2 against which the pen can be located. This area can be used for storage of equipment remote from access by the animal and also gives sufficient distance to receive the animal's head when passed through the panel as described later.

The front panel includes four main uprights 25, 26, 27 and 28 which are arranged in spaced vertical position approximately equidistantly spaced across the width of the panel. The uprights 25 and 28 define end uprights for connection to the uprights 20 of the side panels.

A top rail 29 is welded to the inside faces of the end uprights 25 and 28 and across the top ends of the intermediate uprights 26 and 27. A bottom rail 30 is similarly arranged so that the rails 29 and 30 define the top and bottom respectively of the panel thus forming the uprights and rails into a rectangular structure lying in a common plane.

Between the uprights 26 and 27 is provided an opening 32 which is free from horizontal rails to allow direct access through the opening of a person or operator from the area inside the confinement pen into the storage area 22. The opening 32 can be opened to allow access or can be closed by a door 33 defined by two uprights 34 and 35 together with a plurality of horizontal rails 36 spaced similarly to the rails 31. The simple frame structure forming the door 33 is suspended in a sliding action upon a support rail 36A mounted on the side of the top rail 29 of the panel adjacent the wall 23. The rail 36A extends from the end upright 25 to a position at the upright 27 to allow the door to slide from the closed position to the open position alongside the rails 31.

The upright 27 carries an elongate sleeve 37 which is mounted for rotation around the axis of the tubular upright 27 and carries one part of the headgate described hereinafter. The sleeve 37 carries a pair of collars 38 at spaced positions vertically of the sleeve with each collar rotatable about the axis of the sleeve. Each collar 38 carries a support bracket 39 projecting outwardly therefrom and carrying an inner upright 40 of a squeeze panel 41. The squeeze panel includes the upright 40, a central upright 42 and an end upright 43 together with a plurality of horizontal rails 44. A top one of the rails 44 is indicated at 45 and a bottom one of the rails is indicated at 46 but the bottom rail extends only from the upright 40 to the central upright 42. A bottom rail 47 from the centre upright 42 to the end upright 43 is arranged at a height above the bottom rail 46 thus defining an open area adjacent the rear of the panel. The panel is thus shaped so that it can engage against the side of the animal to squeeze the animal between the panel and the sheet 14B to hold the animal in position. At the same time the raised portion at the rear of the squeeze gate allows access to the rear of the animal. This allows a calf free to move inside the pen to access the milk and allows the operator to access the animal for assisting in the birth. The hinged panel is of a length so that it can lie alongside the front panel with the upright 43 coming close to the upright 25 of the front panel. The offset defined by the projecting supports 39 allows the hinge panel to lie in a plane just in front of the plane of the front panel. In this retracted position, the animal can lie down if desired for the birthing process.

A headgate section 50 is defined between the uprights 27 and 28. The headgate section comprises the sleeve 37 mounted upon the upright 27 for rotation about the vertical axis of the upright 27 and a similar sleeve 51 mounted on the upright 28 for rotation about the vertical axis of the upright 28. At the top end of each of the sleeves 37 and 51 is provided a pulley 52 with the pulleys being coupled by a taut cable 53 so that the pulleys are obliged to rotate in synchronism thus ensuring that the sleeves also remain in synchronism that is at the same angular orientation relative to the post 28. Each of the sleeves 37 and 51 carries a headgate door 54 including an inner neck engaging member 55 and a vertical post 56. The neck engaging member 55 defines an upper section spaced from the sleeve by a greater distance than a lower section with a cranked portion therebetween which is at a height above the normal height of the head of the animal. The lower portion of the neck engaging member is a substantially smooth vertical tubular body so that the animal while its head is trapped between the neck engaging members 55 is free to slide upwardly and downwardly without danger of compression of the neck of the animal.

The top and bottom ends of the neck engaging member and the top and bottom ends of the post 56 are connected to horizontal supports 57 carried by the respective sleeve so that the whole of the gate can pivot with the sleeve about the vertical axis of the upright.

The details of the mounting of a neck engaging member and the bar are shown in the above identified applications and hence will not be includes here.

Figure 2:
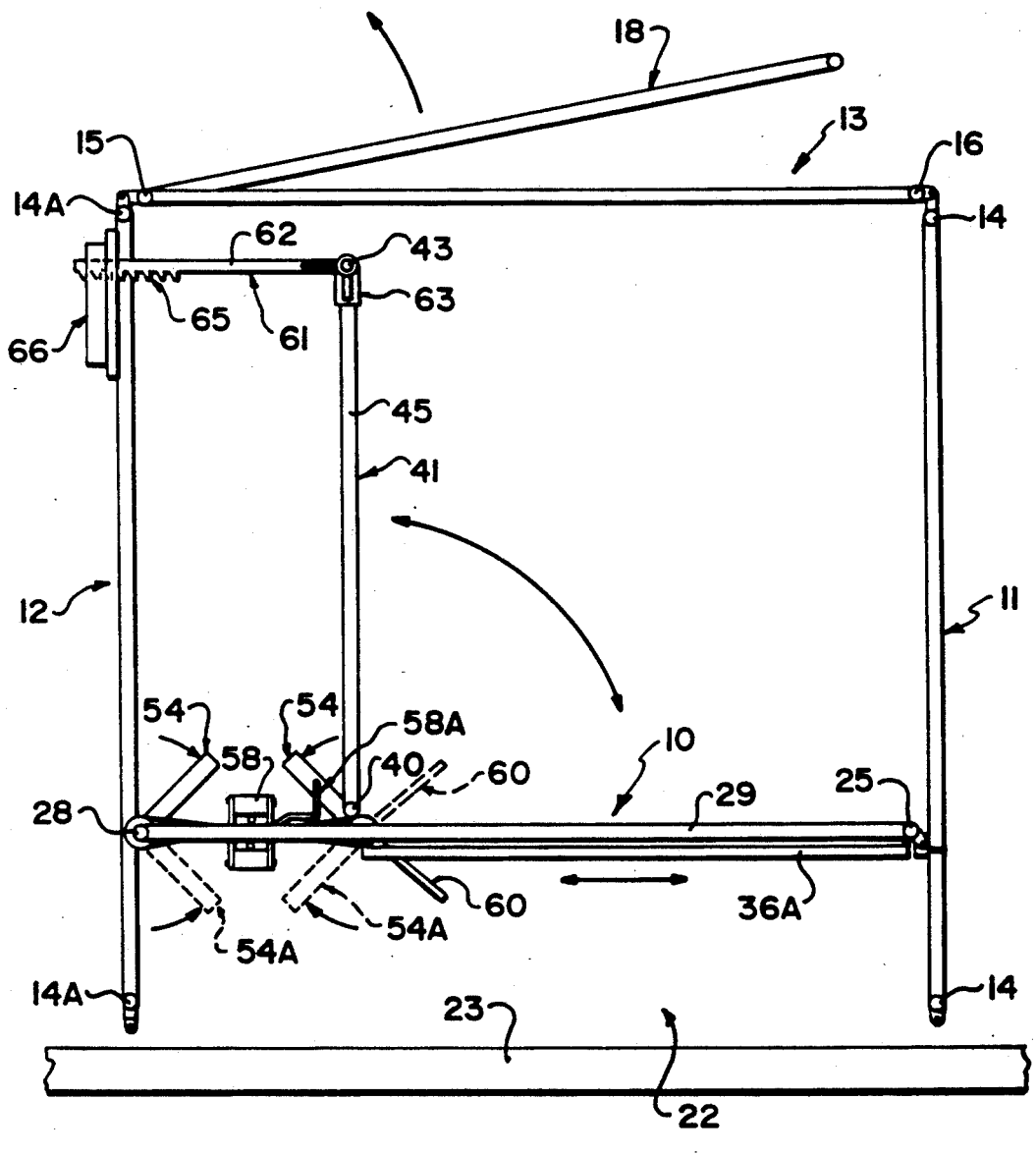
FIG. 2 is a top plan view of the pen of FIG. 1.
Figure 3:
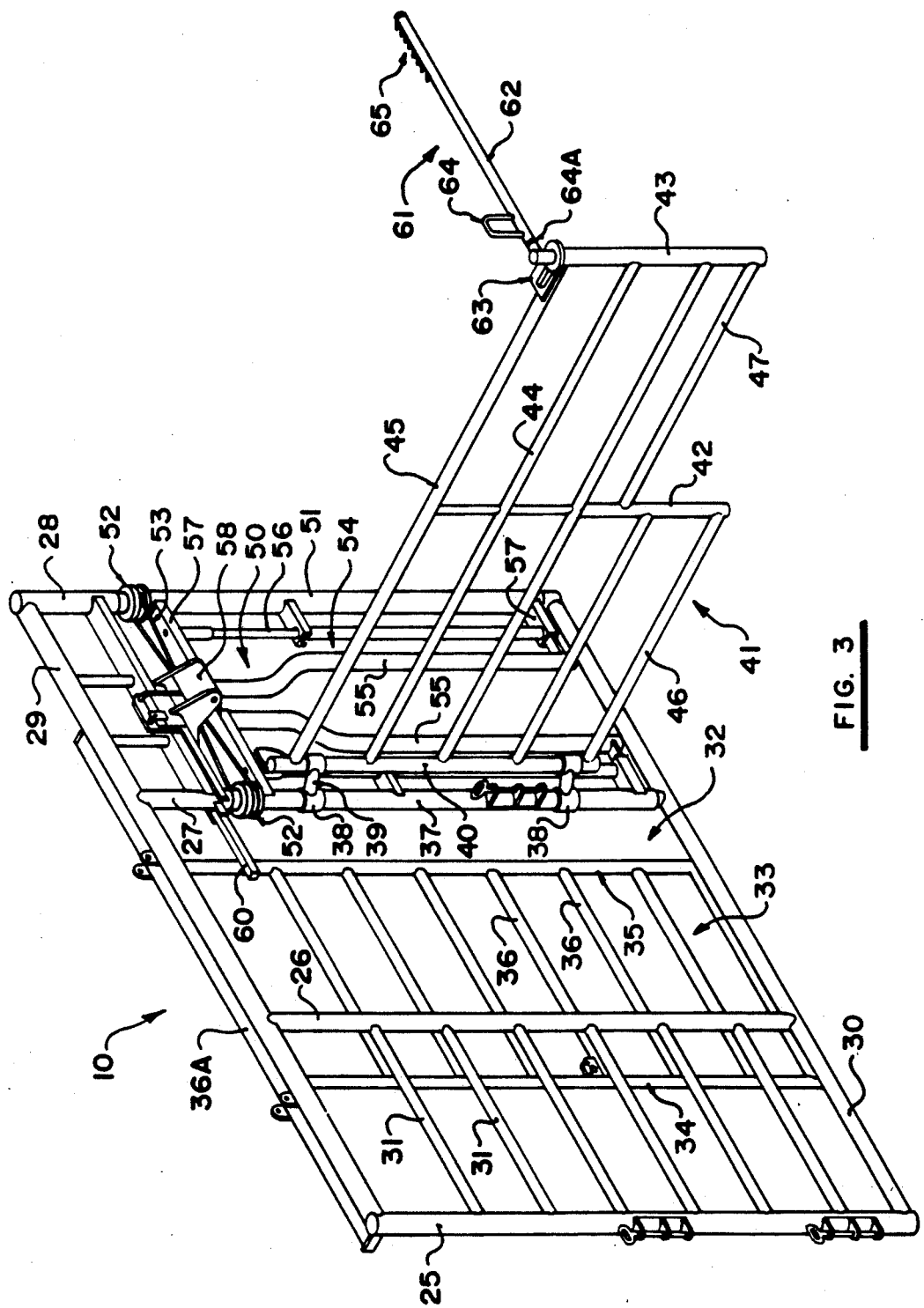
FIG. 3 is an isometric view of the front panel only of the pen of FIG. 1.

As shown in FIG. 2, the headgate doors 54 can move from an initial position projecting out of the panel toward the rear panel 13 so that the neck engaging members are spaced further apart to allow the animals head to enter. From the initial receiving position, the doors 54 can move to the closed position in which the doors lie directly in the plane of the panel and extending between the uprights 27 and 28. In this position the doors are latched by a latch mechanism 58 shown only schematically as latch devices of this type are well known. From the latched position, the doors can be moved either back to the first position for release of the animal or can be moved forwardly into a position indicated in dotted line at 54A to allow release of the animal. Movement is obtained by release of the latch 58 by a manually operable lever 58A and by pivotal action of the doors by a manually movable lever 60.

As shown in FIG. 2, it is not possible physically for the squeeze panel 41 to be moved to the squeezing position while the doors 54 remain in the initial receiving position in view of the engagement of the upright 40 of the squeeze panel with the side of the door closest to the squeeze panel. The doors can therefore only be moved to the initial receiving position while the squeeze panel is pivoted away from the squeezing position either directly parallel to the front or to a shallow angle of the order of 45°. As the squeeze panel is moved from the initial 45° position towards the squeezing position, therefore, it will act to press against the adjacent door causing that door to move to the closed position. As the doors are synchronously linked, both doors will therefore close simply by the action of pulling the squeeze gate 41 toward the squeezing position.

In operation therefore, with the rear gate 18 in the open position, the animal to be confined can be herded into the rear opening of the pen and directed toward the head gate by the user holding the squeeze panel at a 45° angle projecting therefore toward the upright 16. When the animal reaches the headgate, it can be pushed sideways by the panel 41 being moved toward the animal so that the animal is gradually moved to the confining position. In the final action of pushing the squeeze panel to the squeezing position, therefore, the doors of the headgate are closed so that the animal is fully confined. This prevents the situation where the animal can pass directly through the headgate if the headgate remains open beyond the front panel into the storage area or to be released if the pen is not used against a front wall 23.

The squeeze gate can be latched into position by a latch mechanism generally indicated bat 61. The latch mechanism comprises a pole 62 mounted upon the upper rail 45 adjacent the end upright 43 on a plate 63. The pole 62 has a handle 64 which allows it to be rotated about its longitudinal axis on a support portion 64A coupled to the plate 63. On the outer end of the post 62 is mounted a plurality of latching teeth 65 which project out from one side of the pole 62. The latching teeth 65 cooperate with a receiving member 66 attached to the side panel 11 just above the top rail thereof. The receiving member comprises a pair of spaced vertical posts 66A, 66B and an elongate vertical plate 66C which is extending across the area between the ports and is suspended for pivotal action about a horizontal axis. The plate is mounted on the side of the posts remote from the squeeze panel so that it can pivot forwardly but not rearwardly. This plate therefore acts on the latching teeth of the pole 65 and the pole can be engaged by the plate at any location between the posts which is wider than the pole itself to accomodate misalignment. The squeeze gate can therefore be moved to a required squeezing position simply by the user pushing the squeeze gate in toward the animal so that the pole 62 engages against the receiving member 66 with the latching teeth 65 operating on the plate 66C in a ratchet type manner so that the pole slides into the required location and then is held against retraction until the pole is rotated through ninety degrees by actuation of the handle 64 to turn the latching teeth 65 away from the latch plate 66. The confinement of the animal is therefore a single person operation in that the squeeze gate can be pushed gradually into location against the animal and is held in position by the latch mechanism while at the same time the movement of the gate closes the head gate to confine the animal. Even a disturbed or fractions animal therefore can be confined without difficulty and held confined until it becomes calm.

Figure 4:
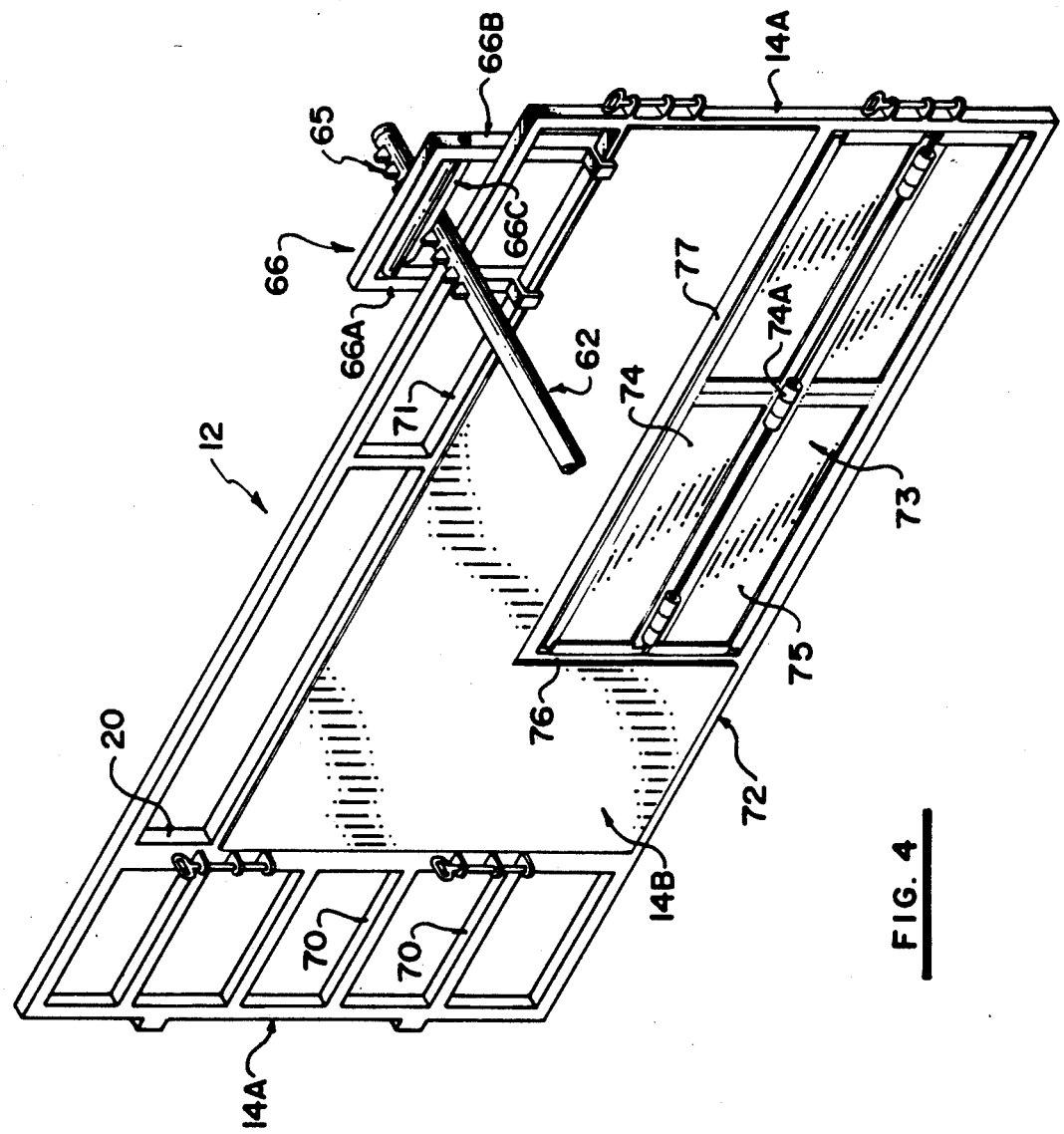
FIG. 4 is an isometric view of the side panel only of the pen of FIG. 1.

The panel 12 is best shown in FIG. 4 and comprises the uprights 14 at each end of the panel and a plurality of horizontal rails as previously described. Between the end upright 14 and the intermediate upright 20, therefore, the panel is open and is defined simply by the horizontal rails indicated at 70. Between the second horizontal rail 71 and the bottom horizontal rail 72 and between the intermediate upright 20 and the rear end upright 14, the panel is closed partly by the covering sheet 14B previously described and partly by a pair of drop boards 73. The design of the drop boards is explained in more detail in the above mentioned copending applications. In the present application it suffice to say that the drop boards comprise a pair of panels 74 and 75 coupled by hinges 74A which allow the top panel 74 to be folded down on the top of the lower panel 75. The ends of the boards are supported in a channel from which the ends can be removed to allow the folding action or to allow the boards to be fully removed. Normally the boards are in the closed position shown in FIG. 4. In an open position, the panel is then rendered open between an upright and the end upright 14 and between a horizontal rail 77 and the ground. This open area is confined to the rear and udder area of the animal and is provided to allow the calf to access milk from that side of the animal to ensure that all tits are used by the calf during the initial period following birth.

Thus the open position, the opening is defined between the ground and approximately a mid height of the panel, and from the rear end to approximately a mid portion. This opening is sized to allow simply the access of the calf to the udder from that side when it is lead to that point by the operator.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An animal containment pen comprising a front panel, two side panels, and a rear panel, the front panel comprising a substantially planar panel body defined by a plurality of upright frame posts and a plurality of transverse frame rails lying in a common vertical plane including a first end post adjacent a first end of the panel body, a second end post adjacent a second end of the panel body opposed to the first end, a top rail and a bottom rail interconnecting said end posts and an intermediate post connected to said top rail and said bottom rail, a headgate section mounted on said first end post and on said intermediate post and defining a headgate opening in the panel body adjacent said first end of the panel body, a hinged squeeze panel mounted on the panel body for pivotal movement about a vertical axis defined by the panel body at one side of the head gate section remote from said first end post so as to squeeze one side of an animal confined with its head in the head gate opening, the head gate section comprising a first vertical neck engaging member mounted on said first end post, a second neck engaging member mounted on said intermediate post, the neck engaging members being movable from a closed position in which the neck of the animal is confined to an open position in which the distance between the first and second neck engaging members is increased to allow entry and exit of the head of the animal from the headgate section, a first of said side panels adjacent said first end post being arranged to contact an opposed side of the animal when squeezed by said squeeze panel, said first side panel including a planar substantially imperforate panel surface extending from a bottom rail at the ground to a top rail spaced from the ground and from a rear end vertical post to a front end vertical post for contacting the adjacent side of the animal arranged for preventing passage therethrough of a leg of the animal, one rectangular portion of the panel surface being openable to allow access to a portion of the animal through said panel surface while preventing the escape of the animal, the rectangular portion extending from said rear end post of said first side panel to an upright intermediate the rear end post and the front end post of said first side panel and extending from the bottom rail of said first side panel at the ground to an intermediate rail below said top rail and a portion of said squeeze panel aligned with said rectangular portion being open to allow access to a portion of the animal through said squeeze panel while preventing the escape of the animal.

2. The pen according to claim 1 wherein the rectangular portion comprises a pair of drop board members each of which is elongate and extends in a horizontal direction with one being arranged above the other and coupled to the other for hinged movement about a common line longitudinal of the boards.

3. The pen according to claim 1 including latch means for latching said squeeze panel at a required position of squeezing, said latch means being responsive to movement of the squeeze panel to the required location to latch said squeeze side panel at the required location.

4. The pen according to claim 3 wherein the latch means comprises an elongate member extending between the squeeze panel and said first side panel.

5. The pen according to claim 3 wherein the latch means comprises an elongate rod member mounted on the squeeze panel and movable therewith into engagement with a receiving means mounted on the first side panel.

6. The pen according to claim 3 wherein said latch means operates automatically to latch said squeeze panel at the required location and includes means for releasing the latch means.

7. The pen according to claim 1 wherein said squeeze panel is mounted such that movement thereof from an open position toward a squeezing position causes movement of the headgate from the open position to the closed position thereof and is separate from said headgate such that the headgate can remain in the closed position while the squeeze side panel is moved back to the open position.

8. The pen according to claim 7 wherein the head gate section includes a pair of doors pivotally mounted on the front panel and movable from the open position in which the doors are inclined from the front panel toward the rear panel, the squeeze panel being mounted such that movement thereof causes an end member thereof to engage one of the headgate doors to directly move the headgate door into the closed position thereof.

9. The pen according to claim 8 wherein said one headgate door is mounted for pivotal movement on said one intermediate post about a vertical longitudinal axis of said one intermediate post and wherein said squeeze panel is mounted for pivotal movement about the same longitudinal axis of said one intermediate post.

10. An animal containment pen comprising a front panel, two side panels, and a rear panel, the front panel comprising a substantially planar panel body defined by a plurality of upright frame posts and a plurality of transverse frame rails lying in a common vertical plane including a first end post adjacent one end of the panel, a second end post adjacent a second end of the panel opposed to the first end, a top rail and a bottom rail interconnecting said end posts and an intermediate post connected to said top rail and said bottom rail, a headgate section mounted on said first end post and said intermediate post and defining a headgate opening in the panel body adjacent said first end of the panel body, a hinged squeeze panel mounted on the panel body for pivotal movement about a vertical axis defined by the panel body at one side of the head gate section remote from said first end post so as to squeeze one side of an animal confined with its head in the head gate opening, the head gate section comprising a first vertical neck engaging member mounted on said first end post, a second neck engaging member mounted on said intermediate post, the neck engaging members being movable from a closed position in which the neck of the animal is confined to an open position in which the distance between the first and second neck engaging members is increased to allow entry and exit of the head of the animal from the headgate section, a first one of said side panels adjacent said first end post being arranged to contact an opposed side of the animal when squeezed by said squeeze panel, and latch means for latching said squeeze panel at a required position of squeezing, said latch means being responsive to movement of the squeeze panel to the required location to latch said squeeze panel at the required location, said latch means comprising an elongate pole mounted on said squeeze panel and arranged to extend between said squeeze panel and said firs side panel, said elongate pole having first latch means, and said latch means further comprising receiving means mounted on said first side panel for receiving said pole and having second latch means thereon for engaging said first latch means in a latching action, said receiving means having a width greater than that of the pole to receive the pole when misaligned, the pole including release means at the end thereof adjacent the squeeze panel for manual actuation of said first latch means to release said latching means to allow the elongate pole to be removed from the receiving means.

11. The pen according to claim 10 wherein the first latch means comprises a plurality of latch teeth on the pole projecting radially outwardly to one side of the pole, and wherein said release means comprises means for rotating the pole about the longitudinal axis thereof to angularly move the latch teeth from a latching position in engagement with the second latch means to a release position free from said second latch means.

12. An animal containment pen comprising a front panel, two side panels, and a rear panel, the front panel comprising a substantially planar panel body defined by a plurality of upright frame posts and a plurality of transverse frame rails lying in a common vertical plane including a first end post adjacent one end of the panel, a second end post adjacent a second end of the panel opposed to the first end, a top rail and a bottom rail interconnecting said end posts and an intermediate post connected to said top rail and said bottom rail, a headgate section mounted on said first end post and said intermediate post and defining a headgate opening in the panel body adjacent said first end of the panel body, a hinged squeeze panel mounted on said intermediate post of the panel body for pivotal movement about a vertical axis defined by said intermediate post at one side of the head gate section remote from said first end post so as to squeeze one side of an animal confined with its head in the head gate opening, the head gate section comprising a first neck engaging gate member mounted on said first end post for pivotal movement about a vertical axis of said first end post, a second neck engaging gate member mounted on said intermediate post for pivotal movement about a vertical axis of said intermediate post, the neck engaging gate members being pivotably movable from a neck engaging position in which the neck of the animal is confined to a receiving position in which the distance between the first and second neck engaging gate members is increased to allow entry of the head of the animal into the headgate section, means connecting the first and second neck engaging gate members for movement commonly from said receiving position to said neck engaging position, said squeeze panel being separate from said neck engaging gate members such that the neck engaging gate members can remain in the neck engaging position while the squeeze panel is moved away from a squeezing position of squeezing said animal toward an open position and said squeeze panel including a portion thereof arranged for abutting said second neck engaging gate member such that movement thereof from said open position toward said squeezing position causes movement of the second neck engaging gate member from the receiving position to the neck engaging position thereof.

13. An animal containment pen comprising two side panels and a rear panel, the front panel comprising a substantially planar panel body defined by a plurality of upright frame posts and a plurality of transverse frame rails lying in a common vertical plane including a first vertical end post adjacent one end of the panel; a second vertical end post adjacent a second end of the panel opposed to the first and; an intermediate vertical post between said first and second end posts and coplanar therewith; a top horizontal rail connected directly to top ends of the first, second and intermediate vertical posts, and a bottom horizontal rail connected directly to the bottom of the first, second and intermediate vertical posts; a head gate section mounted on said first end post and said intermediate post and defining a head gate opening in the panel body adjacent said first end of the panel body; separate in the panel body between two of said posts separate from said head gate section through which an operator can pass; a gate mounted on the panel body and movable from an open position allowing passage of the operator through said separate opening to a closed position closing said separate opening; and a hinged squeeze panel mounted on the panel body for pivotal movement about a vertical axis defined by the panel body at one side of the head gate section remote from said one end so as to squeeze one side of an animal confined with its head in the head gate opening; the head gate section comprising said first end post; a first neck engaging gate member; first collar means mounted on said first end post for rotation about a vertical axis of the post and connected to said first gate member, such that, in a closed position of the head gate section, the first gate member lies in the vertical plane of the panel body and can rotate about said axis to an open position out of said vertical plane; said one intermediate post; a second vertical neck engaging gate member; second collar means mounted on the intermediate post for rotation about a vertical axis of the intermediate post and connected to said second gate member for mounting the second gate member on said intermediate post, such that, in a closed position of the head gate, the second gate member lies in the vertical plane of the panel body and can rotate about said axis to an open position out of said vertical plane.

* * * * *